Patented Mar. 1, 1932

1,847,796

UNITED STATES PATENT OFFICE

WALTER R. THURSTON, OF LOS ANGELES, CALIFORNIA

METALLIC PACKING

No Drawing. Application filed August 29, 1928. Serial No. 302,892.

My invention relates to improvements in metallic packings and the object thereof is to provide a packing, filling or seal for stuffing boxes, axles, shafts, pinions, valve stems or other metallic members comprising parts of machines, pumps, tubes, boxings or the like, so that such stuffing-boxes, axles, shafts, pistons, valve stems or members may be made leak proof against atmosphere, gas or liquid.

The material forming the object of the invention consists of finely divided or powdered or disintegrated metal or metals and any fluid or adhesive binder which will leave the composition in a plastic or essentially fluid state. In making my metallic packing, in various types and for various purposes I have used finely divided, powdered or disintegrated tin, aluminum, copper, lead, antimony or iron, or combinations of these metals with wool grease, wax, tar, pitch, asphaltum or saccharosates, or combinations of these binders or liquids in suitable proportions. I can also use other metals.

A metallic packing of the present kind may be made in the following manner: To eight (8) pounds of wool grease or wool wax add ninety (90) pounds of finely divided, powdered or disintegrated lead or other metal or combination of finely divided, powdered or disintegrated metals and approximately two (2) pounds of graphite. These ingredients may be mixed directly, or rolled together, until the components are as intimately associated as possible. Or, this packing may be made by using another type of binder such as tar, pitch, asphaltum or saccharosate to the amount of two (2) pounds and adding ninety-seven (97) pounds, or less, of finely divided, powdered or disintegrated lead or other metal or a combination of finely divided, powdered or disintegrated metals, and approximately two (2) pounds of graphite. These ingredients may be mixed directly or rolled together, or, in the process of making, heated to any temperature which can be sustained by the binder without altering its form and which is less than the fusing point of the metal factors, and then mixed, when so heated, until the components are as intimately associated as possible. The fluidity, plasticity or stiffness of the packing will be governed by the amounts and kind or kinds or combinations of the metals introduced into the fluid or binder. Whether added to the mixture or not, I use a small proportion of graphite as a facing for the finished product.

The metallic packing described may be made, moulded or fitted in sheets, bars, coils, rings or other shapes, either to be used alone or in conjunction with solid metal washers or packings, or with leather, composition, rubber, fabric or other types of packings, or in combination with them. Its fluid and plastic quality enables it to be squeezed against any movable mechanical part, or introduced into any boxing or stuffing box or bearing, thereby forming at once a seal and a plastic bearing of anti-friction quality. In this connection I have used it with success in water, pumps and various other kinds of stuffing-boxes and bearings.

I claim:

A packing composed of 90% finely divided lead, 8% wool grease, and 2% graphite.

In testimony whereof, I affix my signature.

WALTER R. THURSTON.